Dec. 29, 1959    L. K. LOEHR    2,919,126
CANTILEVER TORSION SPRING MECHANISM FOR WHEELED VEHICLES
Filed April 10, 1957
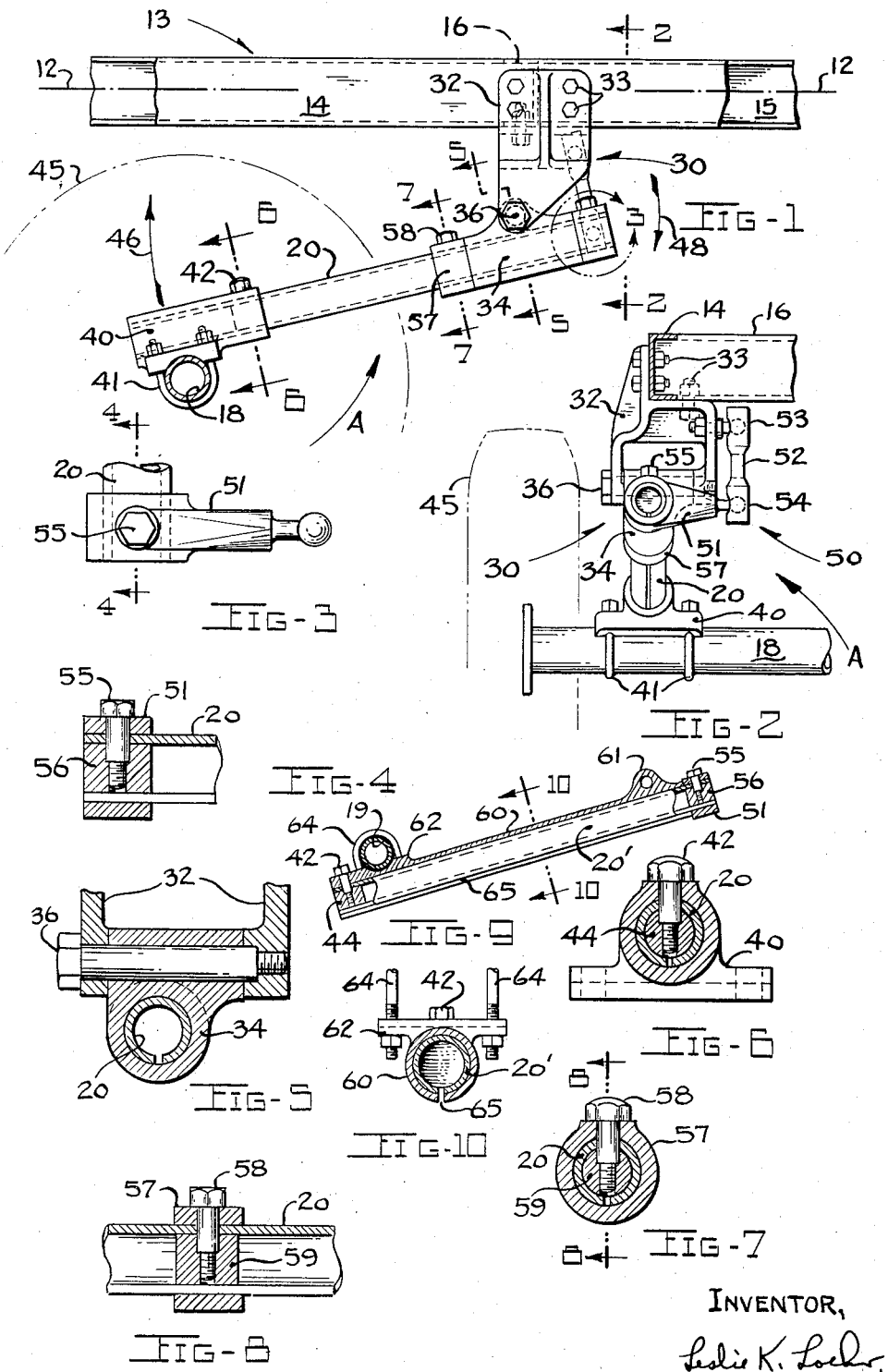
INVENTOR,
Leslie K. Loehr

United States Patent Office 2,919,126
Patented Dec. 29, 1959

2,919,126

CANTILEVER TORSION SPRING MECHANISM FOR WHEELED VEHICLES

Leslie K. Loehr, Los Angeles, Calif.

Application April 10, 1957, Serial No. 651,980

16 Claims. (Cl. 267—57)

This invention relates in general to cantilever spring suspension mechanisms, and in particular to mechanisms of this character especially adapted for wheeled vehicles wherein wheel-supporting axles are connected to the load-carrying structures by torsionally flexible spring elements.

In prior art suspension systems employing torsion springs, it is common practice to support the spring elements in fixed positions on the load-carrying structure of a vehicle and to connect one end of each spring to a wheel supporting axle by means of a structural member hinged for up and down movement of the axle with respect to the load-carrying structure such that twisting forces are applied to the torsion spring. This practice of employing separate structural members for connecting the axles to the load-carrying frame results from the fact that, in order to obtain adequate springiness, a conventional torsion spring is provided with a small cross section in comparison with its length; hence, the spring is incapable of supporting tranverse loads.

The present invention contemplates a force transmitting system capable of functioning as a spring suspension in a wheeled vehicle, which system is characterized by a torsionally deflectable tubular element having a structurally self-supporting perimetric wall with a wall-separating split extending lengthwise of the element from end to end, which element, arranged according to the teaching set forth in copending U.S. patent application Serial No. 591,989, filed June 8, 1956, is suitable not only as a spring, but as a structural member having more than sufficient transverse strength to function as a torque or radius arm for hingedly connecting a wheel-supporting axle to the vehicle load-carrying frame.

Accordingly, it is an object of this invention to connect a wheel-supporting axle to a vehicle load-carrying frame by means of self-supporting torsionally flexible split-walled tubular spring elements so that the tubular elements act not only as torsion springs, but also as structural members having transverse strength of a character such that the tubular elements constitute radius arms hinging the axle to the frame.

It is another object to provide a torsion spring suspension for a load-carrying wheeled vehicle in which an end portion of a split-walled tubular spring element is pivotally connected to the load-carrying vehicle frame such that the axis of the pivotal connection is transversely disposed with respect to the frame and the spring element, and in which the other end portion of the spring element is connected in force-transmitting relationship to the wheel-supporting vehicle axle such that the axis of the spring element is transversely disposed to the axle axis.

It is also an object to provide a torsion spring suspension of the above character in which a linkage is associated with the load-carrying frame and the pivotally connected end portion of the tubular spring element such that pivotal movement of the spring element about the pivotal connection causes twisting forces to be applied to said spring element.

It is a further object to provide such a torsion spring suspension in which the end portions of the split-walled tubular spring element are circumaxially embraced so as to permit optimum helical warpage of the element wall and, at the same time, prevent radial displacement of the wall portions adjacent the split.

An unusual characteristic of a split-walled tubular torsion spring resides in the fact that when the ends of the tubular spring are radially embraced such as to prevent radial displacement of the wall adjacent the split, the spring will twist throughout its overall length when two opposing forces are twistingly applied at spaced-apart locations along the length of the tube; that is, the two twisting forces may be applied at the extreme ends of the spring or anywhere along the tube intermediate the ends as long as there is space between the points of force application and providing the tube ends are confined against radial expansion. Whether the twisting forces are applied at the extreme ends or intermediate the ends, or whether one force is applied at one extreme end and the other applied intermediate the ends, the torsional deflective quality is a function of the overall length of the spring and not just the length of that portion of the spring between the points where the twisting forces are applied; therefore, it is an additional object of this invention to provide a force-transmitting mechanism capable of operating as a spring suspension in which a split-walled tubular spring element is arranged such that at least one of two twisting forces is applied at a point intermediate the ends of the element to provide the mechanism with certain inherent advantages of the aforesaid unusual characteristics.

The novel features of this invention, together with further objects and advantages thereof, will be better understood from the following description considered in connection with the accompanying drawings in which embodiments of the invention are illustrated. It is to be expressly understood, however, that the drawings are for the purpose of illustration and description only, and are not intended as a definition of the limits of the invention.

In the drawings:

Fig. 1 is a side view of a portion of a wheeled vehicle showing a wheel-supporting axle suspended from the vehicle load-carrying frame by spring suspension structures embodying the features of this invention;

Fig. 2 taken on line 2—2 of Fig. 1 is an end view representative of the structures employed on both sides of the vehicle portion shown in Fig. 1;

Fig. 3 is an enlarged plan view of an element shown in Fig. 1;

Fig. 4 is a sectional view taken on line 4—4 of Fig. 3;

Fig. 5 is a sectional view taken on line 5—5 of Fig. 1;

Fig. 6 is a sectional view taken on line 6—6 of Fig. 1;

Fig. 7 is also a sectional view taken on line 7—7 of Fig. 1;

Fig. 8 is a sectional view taken on line 8—8 of Fig. 7;

Fig. 9 is a sectional view of a modification of a portion of the structure shown in Fig. 1; and Fig. 10 is a sectional view taken on line 10—10 of Fig. 9.

The wheeled vehicle, of which a portion is shown in Fig. 1, is so constructed as to be provided with a longitudinal axis 12, a load-carrying frame 13 having side members 14, 15 and a cross member 16, and a wheel-supporting axle 18 suspended transversely of the vehicle frame at substantially right angles to axis 12 by two identical spring suspension assemblies (one from each side of the frame) such as assembly A seen in Figs. 1 and 2 where a tubular spring element 20 having a generally cylindrical self-supporting perimetric wall with a single wall-separating split extending lengthwise of the element from end to end, is shown interconnecting frame 13 and axle 18 such that the weight of frame and any load carried thereby is transmitted to the axle through the spring element.

A spring hanger assembly 30 comprising a bracket 32 and a spring sleeve 34, each constructed to cooperatively receive a pivot pin 36, connects frame 13 and spring element 20 so as to provide for pivotal or hinging movement of the spring element in a generally vertical plane extending lengthwise of the frame, about a pivoting axis transversely disposed with respect to frame axis 12. As shown in Figs. 1, 2 and 5, bracket 32 is provided with a portion attached to frame side member 14 by suitable means such as bolts 33, and with a downwardly projecting yoke portion adapted to receive pivot pin 36 and a pivot bearing portion of spring sleeve 34 (see Fig. 5), which sleeve, it should be noted, is constructed to circumaxially embrace spring element 20 such as to allow for certain movements of the spring relative to the sleeve as hereinafter explained.

An axle bracket 40 firmly secured to axle 18 by U-bolts 41, is constructed to circumaxially embrace spring element 20 such as to permit the characteristic helical warpage of split-walled tubular springs that results from twisting forces applied thereto and, at the same time, provide means which not only supports the axle transversely of the spring, but which also coacts with a shoulder screw 42 such as to provide a fixed connection between spring element 20 and axle 18 of a character capable of applying a twisting force to the spring element. As seen in Fig. 6, shoulder screw 42 extends through radial openings in the walls of bracket 40 and spring element 20 into threaded engagement with an alignment member 44 which serves to maintain the shoulder screw in a radial position.

According to Figs. 1, 2, and 3, a force-transmitting linkage 50 connects one end of spring element 20 to frame 13 such that pivotal movement of the spring element about pivot pin 36 of spring hanger assembly 30 is effective for applying a twisting force to the one end of the spring element. Linkage 50 comprises a torque arm 51 having one end adapted to circumaxially embrace spring element 20 in a manner to permit relative axial movement between sides of the spring element wall adjacent the split, while the other end of arm 51 is connected to bracket 32 by a link 52 attached to bracket 32 and said other end of arm 51 by suitable means such as ball-and-socket joints 53 and 54. A driving connection between arm 51 and spring element 20 is effected by a shoulder screw 55 extending through radial openings in the wall of the embracing end of arm 51 and the wall of element 20 into threaded engagement with alignment member 56 which maintains shoulder screw 55 in a radial position.

Having described the structure whereby tubular spring element 20 interconnects frame 13 and axle 18, it can now be seen that the weight of the frame and any load carried thereby, is not only transmitted to the axle through the spring element, but the structure effecting this weight transmittal produces forces that are twistingly applied to said spring element at two discrete locations. It is clearly shown in Fig. 1 that the weight of frame 13, loaded or unloaded, is transmitted to spring element 20 by hanger assembly 30, and that the spring element transmits this weight through axle bracket 40 to axle 18 which, in turn, transmits the weight to a wheel schematically represented by dot-and-dash line 45. Thus, a force system is effected, in which spring element 20 acts as a beam with one end connected to frame 13 and the other end connected to wheel 45. However, these connections are, in effect, pivotal connections because of the function of pivot pin 36 and wheel 45; hence, the weight transmitted to the wheel causes spring element 20 to rotate about the pivot pin in a clockwise direction so that the axle end of the spring element moves toward frame side member 14 as indicated by arrow 46 and the other end moves away from side member 14 as indicated by arrow 48.

Unrestrained clockwise rotation of spring element 20 about pivot pin 36 is prevented by shoulder screw 42, force-transmitting linkage 50, and the self-contained ability of the spring element to resist torsional deflection induced by forces externally applied. As previously described, torque arm 51 not only embraces one end of the spring element, but it is drivingly connected thereto by shoulder screw 55. Moreover, arm 51 is also connected to frame 13 by bracket 32, link 52 and ball-and-socket joints 53, 54; hence, rotation of spring element 20 in the direction of arrow 48, causes a twisting force to be applied to that end of the spring element embraced by torque arm 51, which twisting force is resisted by an opposing force resulting from the cooperative relationship between axle 18, axle bracket 40, and shoulder screw 42. Thus, movement of spring element 20 about pivot pin 36 causes forces to be twistingly applied to the spring element at points where shoulder screws 42 and 55 extend through the wall of the tubular spring.

In view of the rotation of spring element 20 as effected by linkage 50, spring sleeve 34 embraces the spring element such as to not only permit this rotation, but to also permit the helical warpage of the split wall of the element that results from twisting forces applied by shoulder screws 42 and 55. Axial movement of spring element 20 in spring sleeve 34 is limited by torque arm 51 and a collar 57 circumaxially embracing the spring element, which collar is fixedly positioned by a shoulder screw 58 extending through openings in the walls of the collar and spring element into threaded engagement with an alignment member 59, as shown in Figs. 7 and 8.

It is to be noted that shoulder screw 55 is positioned relatively near one end of spring element 20, while shoulder screw 42 is located axially inward a considerable distance relative to the other end, and that in each case the shoulder screw is diametrically aligned with the split in the cylindrical wall of the spring. This arrangement requires less angular displacement of arm 51 about the axis of spring element 20 than would be the case if shoulder screw 42 were located near the end of the spring. Moreover, this lesser angular displacement is effected without any change in the full-length-deflectability feature of the spring. It was previously stated that, whether twisting forces are applied at the extreme ends or intermediate the ends, or whether one force is applied at one extreme end and the other force is applied intermediate the ends, the torsional deflective quality of a split-walled tubular spring like spring 20, is a function of the overall length of the spring and is not a function of the length of just that portion between the points where the twisting forces are applied. This unique characteristic of spring element 20 provides a wide range of design flexibility in force-transmitting mechanisms of the type employing springs in their force systems.

Figs. 9 and 10 illustrate a modification of spring suspension assembly A shown in Figs. 1 and 2, in which the functions of spring sleeve 34, axle bracket 40 and collar 57 are performed by a single spring support 60, and in which shoulder screws 42 and 55 are both positioned at the ends of spring element 20′. Spring support 60 is a generally tubular member having an end portion 61 adapted to be received by bracket 32 and to receive pivot pin 36, and an end portion 62 adapted for connection to wheel-supporting axle 19 by U-bolts 64 and to receive shoulder screw 42. It is to be noted that the wall of support 60 is split throughout its length by a split 65 to provide torsional flexibility for operating conditions wherein axle 19 is tilted with respect to frame 13, that is, where one wheel on the end of axle 19 moves toward the frame and the other wheel on the other end of the axle moves away from the frame. However, split 65 may be omitted in cases where axle 19 is, in reality, a single wheel-supporting spindle. In cases of this kind, the need for torsional flexibility may not exist, in fact, optimum rigidity may be in order; hence, split 65 would obviously not be required.

In regard to the tilting ability of axle 18 transversely of the vehicle frame with spring suspension assembly A, it should be noted that the torsional flexibility of spring element 20 automatically provides for this essential requirement. It should also be noted that spring element 20, in addition to stresses in bending and torsion caused by weight transmittal to axle 18, is subjected to stresses in tension or compression caused by pulling or pushing forces applied to the axle by the spring depending upon conditions of vehicle movement. In comparison with spring 20, spring 20' of the modification (Figs. 9 and 10) is subjected only to torsional stresses, since spring support 60 is constructed to absorb the forces causing bending, tension, and compression stresses. For this reason, spring support 60, without split 65, is ideally suited for vehicles having one or more single wheel-supporting spindles.

What is claimed as new is:

1. In a vehicle having a load-carrying structure and an axle structure with a load-supporting wheel, a spring suspension interconnecting the load-carrying structure and the axle structure such that the load-carrying structure is resiliently supported by the wheel, said spring suspension comprising: a torsionally flexible tubular element characterized by a longitudinally split wall of which portions adjacent the split are movable relative to each other in opposite directions axially of the element in response to forces twistingly applied to said element about its axis; first means connecting one end of the tubular element to the axle structure such that the axis of said element is transversely disposed with respect to the axis of the wheel; second means connecting the other end of the tubular element to the load-carrying structure such as to provide said element with a transverse pivotal axis extending transversely of the load-carrying structure for swinging movement of the element in a generally vertical plane extending lengthwise of the vehicle such as to afford vertical relative movement of the load-carrying structure with respect to the axle structure; and third means associated with the load-carrying structure and the first and second means for applying twisting forces to the ends of tubular element in response to the load-supporting action of the wheel, said third means including a force transmitting connection between the first means and its respective end of the tubular element, and a linkage having a first portion coupled to the load-carrying structure and a second portion drivingly connected to said tubular element in the region of the second means such that vertical relative movement of the axle and load-carrying structures is effective for applying the twisting forces to said tubular element.

2. The combination defined in claim 1 which is characterized by the fact that the first and second means are structurally interconnected to form a composite member.

3. The combination defined in claim 1 in which the first means comprises a first bracket having a first portion circumferentially embracing one end of the tubular element such as to firmly hold the same but allow for element torsional twist and relative axial movement of element wall portions adjacent the split, and a second portion supporting the tubular element in a fixed position on the axle structure with respect to the wheel in a plane intersecting the axle structure.

4. The combination defined in claim 3 in which the second means comprises a second bracket having first and second sections pivotally interconnected, of which the first section is rigidly attached to the load-carrying structure and the second section firmly embraces an end portion of the tubular element such as to allow for element torsional twist and relative axial movement of element wall portions adjacent the split.

5. The combination defined in claim 4 which is characterized by the fact that the first portion of the first bracket is structurally connected to the second portion of the second bracket such as to form a composite tubular member.

6. The combination defined in claim 5 in which the composite tubular member is provided with a longitudinally split wall such that said composite member affords increased torsional flexibility.

7. In a vehicle having a load-carrying structure and an axle structure adapted to receive a load-supporting wheel, a spring suspension interconnecting the load-carrying structure and the axle structure such that the load-carrying structure is resiliently supported by a wheel, said spring suspension comprising: a torsionally flexible tubular element having a longitudinally split wall characterized by the fact that portions of the wall adjacent the split are movable relative to each other in opposite directions axially of the element in response to forces twistingly applied to said element about its axis; first and second means circumferentially embracing the ends of the tubular element such as to firmly support said element but afford the characterizing relative movement of the wall portions, said first means being associated with the axle structure such as to position said element with respect to the wheel-receiving portion in a plane transversely disposed with respect to the axle structure, and said second means includes a pivotal connection with the load-carrying structure of a character such as to provide the tubular element with a crosswise pivotal axis extending transversely of the load-carrying structure for swinging movement of the element in a generally vertical plane extending lengthwise of the vehicle such as to afford generally vertical movement of the axle structure relative to the load-carrying structure; and third means associated with the load-carrying structure and the first and second means for applying twisting forces to the ends of the tubular element in response to the load-supporting action of a wheel received by the axle structure, said third means including a force transmitting connection between the first means and the tubular element end embraced by said first means, and a linkage having a first portion coupled to the load-carrying structure and a second portion drivingly connected to the tubular element in the region of the second means such that swinging movement of the tubular element about the crosswise axis resulting from generally vertical movement of the axle structure relative to the load-carrying structure is effective for applying twisting forces to said tubular element.

8. The combination defined in claim 7 in which the first and second means are structurally interconnected to form a radius rod having one end connected to the axle structure and the other end pivotally coupled to the load-carrying structure.

9. A spring suspension for a vehicle having a load-carrying structure and a wheel supporting axle structure extending transversely of the load-carrying structure, said spring suspension comprising: a torsionally flexible tubular element having a longitudinal axis and a longitudinally split wall characterized by relative movement of opposing wall portions adjacent the split when the tubular element is twisted about its axis; first and second support members circumferentially embracing respective end portions of the tubular element such as to afford the characterizing relative movement of the element wall portions so embraced, said first support being connected to the axle structure such as to position the tubular element in a plane intersecting said axle structure, and said second support member being connected to the load-carrying structure so as to provide a pivotal connection between said load-carrying structure and the tubular element for pivotal movement of said element in a generally vertical plane extending lengthwise of the vehicle; a linkage for applying rotative forces to the tubular element in the region of the second support member, said linkage including a first portion drivingly connected to said tubular element coaxially adjacent said second member such as to permit torsional deflection of the tubular element without inhibiting the characterizing relative movement of the element wall portions, and a second portion connected to the load-carrying structure such that pivotal movement of the tubular element about the pivotal connection provided by the second support member with respect to the load-carrying structure is effective for producing rotation of said tubular element in said second support member; and a driving connection between the first support member and its respective end portion of the tubular element constructed such as to prevent rotation of said tubular element but permit torsional deflection thereof accompanied by the characterizing relative movement of element wall portions with respect to said first support member for providing means cooperable with the linkage to effect torsional deflection of the tubular element.

10. The combination defined in claim 9 in which the first and second support members are structurally connected to form a composite member interconnecting the axle and load-carrying structures of a vehicle such as to provide for relative vertical movement of said structures.

11. In a force-transmitting system having a supporting structure and a load-carrying structure, a spring suspension interconnecting these structures such that the load-carrying structure is resiliently supported from the supporting structure, said spring suspension comprising: a torsionally flexible tubular element characterized by a self-supporting perimetric wall having a single wall-separating split extending lengthwise of the element from end to end, said split perimetric wall providing said tubular element with torsional flexibility of a character such that opposing forces twistingly applied to said element at two axially spaced locations along the split wall effect longitudinal relative movement between the split-forming portions of said wall accompanied by tendencies of said split-forming portions to move radially at the ends of said tubular element; means interconnecting the tubular element between the supporting structure and the load-carrying structure such as to provide a pivotal axis whereby movement of the load-carrying structure relative to the supporting structure is effected and such that said relative movement applies twisting forces to said tubular element, said means including first and second element-twisting members respectively associated with the supporting and load-carrying structures, and twistingly connected to the tubular element at two longitudinally spaced locations along the split perimetric wall thereof such that longitudinal relative movement of the split-forming wall portions is accommodated; and means circumferentially embracing the ends of the tubular element such that radial movements of the split-forming wall portions at said tubular element ends are precluded without inhibiting longitudinal relative movements thereof when twisting forces are applied to said element by the element-twisting members.

12. The spring suspension defined in claim 11 wherein the self-supporting perimetric wall of the torsionally flexible tubular element comprises a generally cylindrical wall parted lengthwise by said single wall-separating split.

13. The spring suspension defined in claim 12 which is further characterized by the fact that one of the twisting connections between the tubular element and the first and second element-twisting members is radially disposed in the cylindrical perimetric wall of said element in substantially diametric opposition to said wall separating split.

14. The spring suspension defined in claim 12 wherein one of the first and second element twisting members of the interconnecting means includes a portion circumferentially embracing the generally cylindrical perimetric wall of the tubular element at one end thereof such that radial movements of the split-forming portions of the perimetric walls are precluded when twisting forces are applied to the element.

15. The combination defined in claim 12 characterized in that the first and second element-twisting members of the interconnecting means include portions circumferentially embracing the wall perimetric of the tubular element at the ends thereof such that said portions constitute the means precluding radial movement of the split-forming wall portions at said ends without inhibiting longitudinal relative movements of said split-forming wall portions.

16. The combination defined in claim 12 which is further characterized by the fact that the longitudinally spaced locations of the first and second element-twisting members along the split perimetric wall of the tubular element is such that the twisting connection beween said element and one of said element-twisting members is a distance along said split perimetric wall from one end of said tubular element.

References Cited in the file of this patent

UNITED STATES PATENTS

| 2,453,116 | Buckendale | Nov. 9, 1948 |
| 2,798,419 | Moriceau | July 9, 1957 |

FOREIGN PATENTS

| 806,889 | France | Oct. 5, 1936 |
| 737,598 | Germany | Aug. 20, 1943 |
| 749,208 | Germany | Nov. 17, 1944 |